US011812763B2

(12) United States Patent
Bartkowska et al.

(10) Patent No.: US 11,812,763 B2
(45) Date of Patent: Nov. 14, 2023

(54) APPARATUS AND PROCESS FOR COATING EDIBLE RECEPTACLES

(71) Applicant: Conopco, Inc., Englewood Cliffs, NJ (US)

(72) Inventors: Beata Bartkowska, Bromham (GB); Amy Lisa Briggs, Kempston (GB); Mark Willmott, Rushden (GB)

(73) Assignee: Conopco, Inc., Englewood Cliffs, NJ (US)

( * ) Notice: Subject to any disclaimer, the term of this patent is extended or adjusted under 35 U.S.C. 154(b) by 204 days.

(21) Appl. No.: 17/189,045

(22) Filed: Mar. 1, 2021

(65) Prior Publication Data

US 2021/0177003 A1 Jun. 17, 2021

Related U.S. Application Data

(62) Division of application No. 14/786,583, filed as application No. PCT/EP2014/054707 on Mar. 11, 2014, now abandoned.

(30) Foreign Application Priority Data

Apr. 29, 2013 (EP) ..................... 13165705

(51) Int. Cl.
*A23G 9/24* (2006.01)
*A23G 1/00* (2006.01)
*A23G 3/20* (2006.01)
*A23G 7/00* (2006.01)
*B05C 5/02* (2006.01)
*A23G 9/28* (2006.01)
*B05C 21/00* (2006.01)
*A23G 1/50* (2006.01)
*A23G 9/50* (2006.01)

(52) U.S. Cl.
CPC ........... *A23G 9/288* (2013.01); *A23G 1/0066* (2013.01); *A23G 3/2092* (2013.01); *A23G 7/0043* (2013.01); *A23G 7/0093* (2013.01); *A23G 9/245* (2013.01); *B05C 5/0212* (2013.01); *B05C 21/00* (2013.01); *A23G 1/507* (2013.01); *A23G 9/506* (2013.01)

(58) Field of Classification Search
None
See application file for complete search history.

(56) References Cited

U.S. PATENT DOCUMENTS

| | | | |
|---|---|---|---|
| 4,394,392 | A | 7/1983 | Tresser |
| 4,640,219 | A | 2/1987 | Anderson et al. |
| 5,064,666 | A | 12/1991 | Vos |
| 5,370,734 | A | 6/1994 | Ferrero |
| 8,789,489 | B2 | 7/2014 | Daouse et al. |
| 2003/0056662 | A1 | 3/2003 | Pritchard et al. |
| 2003/0198712 | A1* | 10/2003 | Klug ................ A23G 3/54 426/93 |
| 2004/0180120 | A1 | 9/2004 | Leas et al. |
| 2004/0265433 | A1 | 12/2004 | Leas et al. |
| 2008/0206404 | A1 | 8/2008 | Green et al. |
| 2009/0092752 | A1 | 4/2009 | Brandt, Jr. et al. |
| 2010/0133359 | A1 | 6/2010 | Gaetano |
| 2010/0151095 | A1 | 6/2010 | Besse et al. |
| 2011/0151065 | A1 | 6/2011 | Bartkowska et al. |

FOREIGN PATENT DOCUMENTS

| | | |
|---|---|---|
| AU | 642125 | 10/1993 |
| CN | 102145793 | 8/2011 |
| EP | 0023152 | 1/1981 |
| EP | 0589820 | 7/1997 |
| EP | 1103188 | 5/2002 |
| EP | 1430784 | 6/2004 |
| EP | 1584237 | 10/2005 |
| EP | 1346644 | 5/2006 |
| EP | 2111760 | 10/2009 |
| EP | 2338344 | 6/2011 |

(Continued)

OTHER PUBLICATIONS

Written Opinion in EP13165705; dated Dec. 11, 2013.
Search Report in EP13165705; dated Dec. 11, 2013.
Written Opinion in PCTEP2014054707; dated May 15, 2014; World Intellectual Property Org. (WIPO).
Search Report in PCTEP2014054707; dated May 15, 2014; World Intellectual Property Org. (WIPO).
IPRP in PCTEP2014054707; dated Mar. 5, 2015; World Intellectual Property Org. (WIPO).

*Primary Examiner* — Jyoti Chawla

(74) *Attorney, Agent, or Firm* — Gerard J. McGowan, Jr.

(57) ABSTRACT

The present invention provides an apparatus for coating an edible receptacle the apparatus comprising a nozzle for applying a fat-based coating material to the internal surface of the edible receptacle and a gas-dosing element with an external surface shape corresponding to the internal shape of the edible receptacle wherein the gas dosing element has at least one aperture suitable for the introduction of cooled gas into the edible receptacle. The invention also provides a process for manufacturing a coated edible receptacle for a frozen confection comprising the steps of: providing an edible receptacle; at least partially coating the internal surface of the edible receptacle by spraying a fat-based coating onto the internal surface of the edible receptacle; and introducing a gas-dosing element into the edible receptacle, wherein the gas-dosing element has an external surface shape corresponding to the internal shape of the edible receptacle and wherein cooled gas is introduced into the edible receptacle through the gas-dosing element and wherein the gas dosing element does not come into contact with the fat-based coating.

10 Claims, No Drawings

(56) References Cited

FOREIGN PATENT DOCUMENTS

| | | |
|---|---|---|
| FR | 2604651 | 4/1988 |
| GB | 0554707 | 12/1996 |
| WO | WO8100190 | 2/1981 |
| WO | WO9113557 | 9/1991 |
| WO | WO0215706 | 2/2002 |
| WO | WO2005096827 | 10/2005 |
| WO | WO2008129417 | 10/2008 |
| WO | WO2009048744 | 3/2011 |

* cited by examiner

APPARATUS AND PROCESS FOR COATING EDIBLE RECEPTACLES

FIELD OF THE INVENTION

The present invention relates to an apparatus and process for providing coated edible receptacles for frozen confections. In particular the invention relates to an apparatus and process that prolongs the crispness of edible receptacles for frozen confections.

BACKGROUND OF THE INVENTION

Frozen confections are consumed as snacks or desserts worldwide and are often served in edible receptacles such as waffles, cones, shells, cups, and the like. These edible receptacles are typically made of baked wafer material and are used to contain the frozen confection. When eaten along with the frozen confections their crispness provides an enhanced sensorial experience that is highly desired by the consumer.

The wafers used in edible receptacles are generally a baked preparation made from a batter of flour (such as wheat flour or refined wheat flour), sugar and other ingredients. Presence of starches from refined wheat flour, sugar anhydrides formed during high temperatures of baking and un-crystallised invert sugar makes the baked wafer highly hygroscopic. The edible receptacles may therefore absorb moisture immediately after baking or during storage. Contact with high moisture containing food systems, especially frozen confections such as ice-cream, therefore leads to absorption of moisture by the edible receptacles.

Moisture migration from the frozen confection to the edible receptacle depends on the amount of water and the water activity of the two components. Varying water activities (aw) and moisture content causes a state of non-equilibrium. Water activity (aw) or relative vapour pressure is the chemical potential of water vapour at constant or equilibrium relative humidity. Water thus migrates from areas of high water activity to areas of low water activity. Therefore, migration of water from a frozen confection (aw 0.97, 60% moisture) to an edible receptacle (aw 0.2 to 0.3, 2% moisture) occurs continuously in an attempt to reach equilibrium.

As a result of this migration edible receptacles tend to lose their crispness and other sensorial characteristics, they suffer a decrease in shelf life and also undergo undesirable changes in texture. During the migration of the water, water soluble colours may also migrate from the frozen confection to the edible receptacle which may further affect the visual appearance of the product.

Edible receptacles may be filled with ice-cream immediately before consuming or they may be pre-packed with a frozen confection and stored in a freezer. In pre-packed edible receptacles, the edible receptacles may absorb water from the frozen confection at the time of filling and also during storage. This is even more pronounced when there are large fluctuations in storage temperature. In addition frosting, ice, or other condensation may build up on the surfaces of the frozen confection and may subsequently melt upon exposure to ambient temperatures, further contributing to a reduction in crispness.

Although this problem is predominantly found in edible receptacles for frozen confections, it applies equally to any crisp food product, notably wafers, cookies, biscuits and other common snacks. Such food products, although crispy when made, will become soft when combined with the food product they contain due to moisture penetration from the food product.

A common approach to the problem presented by moisture migration is to use a fat-based coating that is applied to the edible receptacle in order to act as a barrier between the edible receptacle and the frozen confection. This layer is typically a chocolate, a chocolate-like composition, a chocolate analogue, or a couverture and is used to coat at least the surface of the edible receptacle that will be in contact with the frozen confection.

WO 91/13557 discloses an apparatus for forming a layer of chocolate on the interior surface of an ice cream having a cone-shape mould that is interiorly cooled by ice water provided from a bucket, or other source, of ice water. For forming an interior chocolate coating, liquid chocolate is placed into the interior of the cone, and the cone is then placed on to the cone mould, and centred thereon by the upper end portion of the mould. The cone is allowed to remain there for a short while, while the cold mould surface solidifies the liquid chocolate, to thereby form the interior layer of chocolate. This application therefore discloses that a cooled mould can be used to displace a measure of molten chocolate from the base of a cone, thereby distributing the chocolate up the side walls of the wafer cone. The fact that the mould is cooled facilitates hardening of the chocolate to form the inner coating of the cone. Cooled moulds are similarly disclosed in US 2004/0265433, WO 02/15706, EP 1 103 188, and AU 642125. In these four disclosures, cooled forming elements are also used to displace a measure of molten chocolate from the base of a cone, thereby distributing the chocolate up the side walls of the cone to form a cone-shaped chocolate structure. However, the direct contact of a mould with the chocolate layer suffers disadvantages such as structural damage to the chocolate layer caused by direct contact and issues in disengaging the mould from the chocolate which may cause further damage and slow production. Moreover the approach requires very accurate dosing of the chocolate to the base of the cone and relatively high pressures to force the chocolate up the side of the cones.

WO 81/00190 discloses a process for producing a composite edible product in which a dry edible material, for example a baked wafer container, is separated from direct contact with a water-containing edible material, for example ice confection, by a relatively water-impermeable edible fat-containing layer, by applying a spray of the fat-containing material to the dry edible material before application of the water-containing edible material, characterised in that the spray of fat-containing edible material is applied from an atomising spray gun and has a particular viscosity. This application utilises the use of spray to apply the fat-containing material to the dry edible material and therefore does not suffer the disadvantage of the use of a dose of molten chocolate in the base of the cone. The application therefore does not use a cooled moulding element to distribute the fat-containing material. One embodiment of WO 81/00190 discloses that good results have been achieved by cooling the sprayed-on fatty layer by an applied cooling fluid stream, for example liquid nitrogen. However, this embodiment requires improvement in order to optimise the performance of the edible fat-containing layer.

As can be seen from the foregoing, although the use of fat-based coatings in edible receptacles for frozen confections has been known for some time it is not a perfect solution and the organoleptic properties of edible receptacles still degrade over time with the crispness being lost despite the application of the protective layer.

It is therefore an object of the present invention to improve upon the current approaches for creating coated edible receptacles for frozen confections.

It is another object of the present invention to provide an edible receptacle for frozen confections that has improved moisture barrier properties.

It is another object of the present invention to provide an edible receptacle for frozen confections that retains its crispness at the time of consumption.

It is another object of the present invention to provide a coating for edible receptacles for frozen confections that shows improved moisture barrier properties during long periods of cold storage even under varying temperature conditions.

It is another object of the present invention to provide a method and apparatus for manufacturing a coated edible receptacle for frozen confections.

It is yet another object of the present invention to provide an edible receptacle for frozen confections that has an improved shelf life period.

It is yet another object of the present invention to provide coated edible receptacles that have good storage stability even at higher storage temperatures.

SUMMARY OF THE INVENTION

We have now found that the above objectives are met though the use of a particular apparatus.

Accordingly, in a first aspect the present invention provides an apparatus for coating an edible receptacle comprising a nozzle for applying a fat-based coating material to the internal surface of the edible receptacle and a gas-dosing element with an external surface shape corresponding to the internal shape of the edible receptacle wherein the gas dosing element has at least one aperture suitable for the introduction of cooled gas into the edible receptacle.

Preferably the aperture is in gas communication with a source of cooled gas.

Preferably the cooled gas is at a temperature of at most −20° C., more preferably at most −30° C., more preferably still at most −50° C., yet more preferably still at most −75° C., even more preferably at most −100° C., most preferably at most −120° C.

Preferably the cooled gas is at a temperature of at least −200° C., more preferably at least −180° C., more preferably still at least −150° C.

Preferably the cooled gas is nitrogen.

Alternatively the cooled gas is a noble gas.

In a second aspect the present invention provides a process for manufacturing a coated edible receptacle for a frozen confection comprising the steps of:
  providing an edible receptacle,
  at least partially coating the internal surface of the edible receptacle by spraying a fat-based coating onto the internal surface of the edible receptacle, and
  introducing a gas-dosing element into the edible receptacle
wherein the gas-dosing element has an external surface shape corresponding to the internal shape of the edible receptacle and wherein cooled gas is introduced into the edible receptacle through the gas-dosing element and wherein the gas dosing element does not come into contact with the fat-based coating.

Preferably the cooled gas is at a temperature of at most −20° C., more preferably at most −30° C., more preferably still at most −50° C., yet more preferably still at most −75° C., even more preferably at most −100° C., most preferably at most −120° C.

Preferably the cooled gas is at a temperature of at least −200° C., more preferably at least −180° C., more preferably still at least −150° C.

Preferably the edible receptacle is a wafer-based edible receptacle.

Preferably the edible receptacle is a cone.

Preferably the edible receptacle is coated with fat-based coating in a total amount of from 2 to 12 g, more preferably from 4 to 10 g, more preferably still from 6 to 8 g.

Preferably the weight ratio of the total amount of the fat-based coating relative to the edible receptacle is from 5:1 to 1:5.

Preferably the fat-based coating is selected from the group comprising of chocolate, chocolate-based compositions, chocolate analogues, and couvertures.

Preferably the melting point of the fat-based coating is from 20° C. to 50° C., more preferably from 25° C. to 45° C., more preferably still from 30° C. to 40° C.

Preferably the thickness of the final fat-based coating on the coated edible receptacle is at least 0.5 mm, more preferably at least 0.75 mm, more preferably still at least 1 mm, most preferably at least 1.5 mm.

Preferably the thickness of the final fat-based coating on the coated edible receptacle is at most 5 mm, more preferably at most 3.5 mm, more preferably still at most 2.5 mm, most preferably at most 2 mm.

In a third aspect, the present invention provides a method for prolonging the crispness of an edible receptacle for a frozen confection, the method comprising the steps of:
  providing an edible receptacle,
  at least partially coating the edible receptacle by spraying a fat-based coating onto the internal surface of the edible receptacle, and then
  introducing cooled gas into the edible receptacle through a gas-dosing element having an external surface shape corresponding to the internal shape of the edible receptacle.

In a fourth aspect, the invention provides a coated edible receptacle produced by the process of the second aspect.

In a final aspect the invention provides a composite frozen confectionary comprising the coated edible receptacle of the fourth aspect in combination with a frozen confection such as ice cream.

These and other aspects, features and advantages will become apparent to those of ordinary skill in the art from a reading of the following detailed description and the appended claims. For the avoidance of doubt, any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

DETAILED DESCRIPTION OF THE INVENTION

Frozen confections are consumed as snacks or desserts worldwide and are often served inside edible receptacles. The combination of the frozen confection with the edible receptacle is referred to as a composite frozen confection. When eaten along with the frozen confections these edible receptacles provide an enhanced sensorial experience that is highly desired by the consumer. An especially preferred aspect of these edible receptacles is the firm and crisp texture that they impart to composite frozen confection products. Edible receptacles can be made of various materials that provide the desired organoleptic properties, in particular crispiness. Traditionally edible receptacles are made from baked wafer material. An edible receptacle can also be formed from other materials such as pieces of nut and/or biscuit which are held together with a binder such as a sugar based compound.

Although the invention is predominantly focused on edible receptacles for frozen confections, it may also be employed with other baked dough based food products, such as cookies, biscuits and other baked dough based snacks.

In a preferred embodiment, the edible receptacle is an ice-cream cone. Ice cream cones may be made from a batter of wheat flour or refined wheat flour, sugar, edible oil, lecithin and water. Cones can be made by methods known in the art. One method for preparing a cone is by a moulding process. This process includes the steps of depositing the batter into a mould; inserting a core into the mould such that the batter is forced to assume the shape of the cavity provided between the core and the mould; removing the core when the core of the mould is joined with the batter; subjecting the mould to heat for an appropriate length of time and discharging the cones from the mould at the completion of the specified time. Prepared cones are preferably discharged onto a conveyor for trimming, packing, coating, filling, storage and distribution. By this method cones of various shapes including but not limited to conical shape or cups of various sizes and configurations may be made. Another method of preparing an ice-cream cone is by a rolling process. This process includes the steps of depositing the batter between two plates; baking a flat wafer between the plates; transferring the flat wafer sheet to a rolling device; and rolling the flat waffle into a conical shape. Ice-cream cones made by this process are sometimes referred to as called sugar roll cones.

Such wafer-based edible receptacles may include 45 to 80 wt % wheat flour. Preferred compositions include 48 to 80 wt % wheat flour. More preferred compositions include 50 to 75 wt % wheat flour. Further preferred compositions include 55 to 70 wt % wheat flour, and optimal compositions include 58 to 65 wt % wheat flour. The wafer-based edible receptacles also include 15 to 50% by weight of sugar. Preferred compositions include at least 17%, more preferably at least 19%, still more preferably at least 21%, or even at least 25%, but preferably not more than 45%, more preferably not more than 40%, still more preferably not more than 35%, even more preferably not more than 30% by weight of sugar. They may also include 1 to 30 wt % edible oil. Preferred compositions include 1 to 15 wt % edible oil. More preferred compositions include 1 to 8 wt % oil. Further preferred compositions include 1.5 to 6 wt % oil. Still further preferred composition include 2 to 5.5 wt % of edible oil, and optimal compositions include 2.5 to 4.5 wt % edible oil. The edible oil may be selected from any of the known sources. Preferably the edible oil is a C12-C18 edible oil. Preferably the edible oil is palm oil or coconut oil. Further, the wafer-based edible receptacles may includes 0 to 3 wt % lecithin. Preferred compositions include 0.1 to 2 wt % lecithin. More preferred compositions include 0.2 to 0.8 wt % lecithin. Further preferred compositions include 0.3 to 0.7 wt % lecithin. Still further preferred compositions include 0.35 to 0.65 wt % lecithin, and optimal compositions include 0.4 to 0.6 wt % lecithin. Finally, a wafer-based edible receptacle may include a small amount of water. However, in order to keep the cone crispy during storage, it is preferred that the edible receptacle is substantially free of water. By substantially free of water is meant, not more than 3%, more preferably not more than 2%, still more preferably not more than 1%, even more preferably not more than 0.5%, yet more preferably not more than 0.2%, or even less than 0.1% by weight of water.

Optional ingredients for wafer-based edible receptacles include caramel which acts as a colouring agent when added to the edible receptacle. It is an amorphous, dark-brown material that has been produced by the carefully controlled heat treatment of saccharine materials such as dextrose, invert sugar, lactose, malt syrup, molasses, sucrose, starch hydrolysates and fractions thereof, etc. The heavy-bodied, almost black syrup contains colour components that impart the amber shade found in carbonated beverages, pharmaceutical and flavouring extracts, candies, soups, bakery products, and numerous other foods. When caramel is present the edible receptacle preferably includes about 0.2 wt % of caramel. A wafer-based edible receptacle cone may also preferably include salt. Preferred salt is sodium chloride. When present the cone preferably includes about 0.2 wt % of salt.

Although the cone format is particularly preferred an edible receptacle may also be provided in a range of other different shapes and sizes such as cups and shells. The edible receptacle can also be a flat waffle-type sheet such as those used in "sandwich"-like products. These waffle-type sheets can be coated at least over the area of the sheet that would otherwise come into contact with a frozen confection.

Fat-based coatings are commonly used in an attempt to create a barrier between the edible receptacle and the frozen confection it contains. Such fat-based coatings include chocolate, chocolate-based compositions, chocolate analogues, and couvertures. The term chocolate as used herein includes dark chocolate and milk chocolate. The term chocolate analogue means chocolate-like fat-based confectionery compositions made with fats other than cocoa butter (for example cocoa butter equivalents, coconut oil or other vegetable oils). Such chocolate analogues are sometimes known as couvertures. Chocolate analogues need not conform to standardized definitions of chocolate which are used in many countries. In addition to fat and cocoa solids, chocolate and chocolate analogues may contain milk solids, sugar or other sweeteners and flavourings.

These fat-based coatings will typically have a melting point of about 30-40° C. and are therefore solid at room temperature and so are also solid under the conditions and temperatures at which frozen confections are dosed into edible receptacles and at which the coated edible receptacles are stored either in an empty state or having been filled with a frozen confection.

The term 'frozen confection' means an edible composition made by freezing a mix of ingredients which includes water. Frozen confections include ice cream, water ice, frozen yoghurt and the like. Frozen confections typically contain fat, non-fat milk solids and sugars, together with other minor ingredients such as stabilisers, emulsifiers, colours and flavourings.

The apparatus of the present invention comprises a nozzle for applying a fat-based coating material to the internal surface of the edible receptacle. The nozzle may be of a suitable configuration known to the skilled practitioner and is capable of distributing a fat-based coating across at least part of the interior of the receptacle. Typically the fat-based coating will be heated such that it is molten and flowable whereupon it is fed into the nozzle at high pressure and exits in the form of dispersed droplets which then coat the receptacle.

The apparatus also comprises a gas-dosing element. This element has an external surface shape corresponding to the internal shape of the edible receptacle that is coated. For example where the receptacle is a cone, the gas-dosing element will be cone shaped and will have approximately the same wall angles as the cone. Similarly, where the receptacle is cup shaped the gas-dosing element will have a frusto-conical shape wherein the wall angles correspond to those of the cup and the truncated end corresponds to the base of the cup. As will be described below, the gas-dosing element can therefore be introduced into an edible receptacle, without touching the receptacle or the coating, and therefore when in position allows for the creation of a low volume void between itself and the receptacle.

The gas-dosing element also has at least one aperture which allows for the introduction of cooled gas into the low volume void created between itself and the receptacle. Preferably the gas enters the element through a main inlet which splits at a manifold to a plurality of outlets which exit the element at a plurality of apertures located across the surface of the element. The gas can be cooled by suitable means such as extracting the gas direct from a refrigerating apparatus or by running the gas through a coil immersed in a cooling medium such as liquid nitrogen or a liquid noble gas. In an alternative embodiment a liquefied gas could be the fed into the gas-dosing element through the inlet and would exit the element as a gas via the apertures.

In certain embodiments, the cooled gas can be at a temperature of at most −20° C., more preferably at most −30° C., more preferably still at most −50° C., yet more preferably still at most −75° C., even more preferably at most −100° C., most preferably at most −120° C. The cooled gas is at a temperature of at least −200° C., more preferably at least −180° C., more preferably still at least −150° C.

In use, the apparatus works as follows. An edible receptacle is first provided, the internal surface of which is at least partially coated by spraying a fat-based coating onto the internal surface of the edible receptacle using a nozzle as described above. In one embodiment, the edible receptacle is coated with fat-based coating in a total amount of from 2 to 12 g, more preferably from 4 to 10 g, more preferably still from 6 to 8 g. The weight ratio of the total amount of the fat-based coating relative to the edible receptacle can be from 5:1 to 1:5. The fat-based coating may be selected from the group comprising of chocolate, chocolate-based compositions, chocolate analogues, and couvertures. The melting point of the fat-based coating is typically from 20° C. to 50° C., more preferably from 25° C. to 45° C., more preferably still from 30° C. to 40° C. When coated, the thickness of the final fat-based coating on the coated edible receptacle may be at least 0.5 mm, more preferably at least 0.75 mm, more preferably still at least 1 mm, most preferably at least 1.5 mm and may be at most 5 mm, more preferably at most 3.5 mm, more preferably still at most 2.5 mm, most preferably at most 2 mm.

Once coating has taken place, the gas-dosing element is then introduced into the edible receptacle for example by lowering the element into the receptacle, raising the receptacle to the element or a combination of these movements. The gas dosing element and the coated receptacle are brought into proximity but do not touch one another. Since the gas-dosing element has an external surface shape corresponding to the internal shape of the edible receptacle this co-location allows for the creation of a low volume void between dosing element and receptacle.

A cooled gas is then introduced into this low volume void via the gas-dosing element. The temperature of the gas can be as described above.

As noted above, although the use of fat-based coatings in edible receptacles for frozen confections has been known for some time it is not a perfect solution and the organoleptic properties of the edible receptacles still degrade over time, in particular the crispness of the edible receptacle is lost despite the application of the protective layer. However, it has surprisingly been found that the introduction of a cooled gas into the low volume void described above is capable of enhancing the ability of the fat-based coating to maintain the required crispness of the edible receptacle. Therefore, the present invention makes use of the surprising finding that even if typical fat-based coatings are used and even if the same amount of the fat-based coating is used (i.e. there is no need to use excess amounts which could detract from the consumer acceptance of the product and would add extra cost and unhealthy ingredients) then the edible receptacle that is coated with the fat-based coating using the apparatus and process of the present invention will maintain the critical organoleptic properties for longer.

The invention therefore provides a coated edible receptacle with improved properties as described above. After coating, the coated edible receptacle can be stored in its empty state or filled with a frozen confection such as ice cream and optionally topped with a sauce, nuts, chocolate pieces or the like to provide a composite frozen confectionary product that can then be stored prior to distribution to the point of sale.

As has been outlined above, the process of the invention can be used for the production of coated edible receptacles that are resistant to changes in their organoleptic properties, specifically crispness. This invention therefore also provides a method for prolonging the crispness of an edible receptacle for a frozen confection. Through the use of this method it has been found that the organoleptic properties of coated edible receptacles are maintained for longer than a coated edible receptacle that has not benefited from the introduction of a cooled gas into the void between gas-dosing element and coated receptacle.

The present invention will now be further described with reference to the following non-limiting examples.

EXAMPLES

Cones

The cones used in this experiment were standard Cornetto cones made on a standard baking line.

Fat-Based Coating

The composition of the fat-based coating was the standard chocolate spray inside a Cornetto. The recipe is shown in Table 1.

TABLE 1 composition of fat-based coating

| Ingredients | wt % |
| --- | --- |
| Sucrose | 43 |
| Coconut oil | 31 |
| Palm oil | 16.5 |
| Cocoa powder | 9 |
| Ammonium Phosphatide | 0.4 |
| Vanillin | 0.1 |

Frozen Confection

The frozen confection used is shown in table 2.

TABLE 2 composition of frozen confection

| Ingredients | wt % |
| --- | --- |
| Water | 61.920 |
| Coconut oil | 9.000 |
| Skimmed milk powder | 9.000 |
| Sucrose | 12.500 |
| Maltodextrin (MD40) | 4.000 |
| Liquid Fructose | 3.000 |
| Locust Bean Gum | 0.144 |
| Carrageenan | 0.016 |
| Mono diglyceride emulsifier (HP60) | 0.300 |
| Vanilla Flavour | 0.120 |

Four different techniques were used to prepare 4 sets of ice cream cone products:
  Room temperature setting (coating allowed to cool at room temperature)
  Cold room setting (coating allowed to completely set at −2° C.)
  Process A (process according to the invention)
  Process B (process according to the invention)

Room Temperature Setting Process (Comparative Examples):

6.5 grams of the fat-based coating were sprayed into ice-cream cones by using an Autojet spray rig, with a conical spray nozzle. The coating was at a temperature of about 40° C. The fat based coating was allowed to set at ambient temperature (approx 18° C.) for 10 seconds. The coated ice-cream cones were then filled with 90 ml (47 g in weight) of the frozen confection at a temperature of about −5 to −6° C. This approach typifies the normal production in factories where it is important to have high throughput of products and so there is very limited time between coating and filling the cones.

Cold Room Setting Process 6.5 grams of the fat-based coating were sprayed into ice-cream cones by using an Autojet spray rig, with a conical spray nozzle. The coating was at a temperature of about 40° C. The coated cones were then transferred to a cold room at a temperature of 2° C. until the coating had completely set. The coated ice-cream cones were then filled with 90 ml (47 g in weight) of the frozen confection at a temperature of about −5 to −6° C. This example typifies a "gold standard" approach where the coating is allowed to completely set. However such an approach is unsuitable for industrial production due to the added complexity in the process and significant additional time taken to set the coating.

Process A 6.5 grams of the fat-based coating were sprayed into ice-cream cones by using an Autojet spray rig, with a conical spray nozzle. The coating was at a temperature of about 40° C. A gas dosing element was positioned above the cone and cooled gas at a temperature of about −130° C. was dosed into the cone for about 1 second. The gas was cooled by having been passed through a tube immersed in liquid nitrogen. The coated ice-cream cones were then filled with 90 ml (47 g in weight) of the frozen confection at a temperature of about −5 to −6° C.

Process B 6.5 grams of the fat-based coating were sprayed into ice-cream cones by using an Autojet spray rig, with a conical spray nozzle. The coating was at a temperature of about 40° C. A gas dosing element was positioned above the cone and then lowered into the cone. Cooled gas at a temperature of about −130° C. was dosed into the cone for about 1 second. The gas was cooled by having been passed through a tube immersed in liquid nitrogen. The coated ice-cream cones were then filled with 90 ml (47 g in weight) of the frozen confection at a temperature of about −5 to −6° C.

All four of the processes were carried out on the same factory line on the same day under the same conditions.

Assessment of Performance of Cones Over Time

All cones were stored for a total of 69 days at −10° C. This temperature is higher than normal storage temperatures and was chosen since this elevated temperature speeds up the degradation of the cones. In effect, storage at −10° C. can be used to simulate the abuse through the cold chain. Each day at −10° C. is equivalent to 11 days at −30° C., therefore every 3 days is approximately equal to 1 month storage at −25/30° C.

Moisture Content of Cones Over Time

Cones were selected on days 51, 65 and 69 which are representative of over a year of storage. The moisture contents of each of these cones were measured using an apparatus which dried the samples, determined the resulting difference in weight between the original and dried samples, and hence produced a percentage moisture content measure. In this experiment, two cones of each type (standard vs. double-sprayed) were taken from the freezer, the ice cream and chocolate was removed, and the cones were then crushed. A 1.2 g sample of each cone type was placed into the apparatus and the moisture measured. 5 repeats were performed. The resulting average moisture content for cones are shown in table 3.

TABLE 3 results of moisture content analysis

| | Moisture content (%) | | |
| --- | --- | --- | --- |
| Cone type | Day 51 | Day 65 | Day 69 |
| Room temperature setting | 5.29 | 6.05 | 6.99 |
| Cold room setting | 4.36 | 4.09 | 4.51 |
| Process A | 4.60 | 5.06 | 3.71 |
| Process B | 5.09 | 5.69 | 5.17 |

The results of the moisture analysis clearly demonstrate that the apparatus and process of the invention dramatically reduce the amount of moisture that was able to penetrate into the cone. It was found that use of the gas dosing element reduced the amount of moisture in the cone compared to the standard approach typed by the room temperature setting cones. At day 69 the room temperature setting cones contained 7% moisture whereas the cones of process A contained only 3.7% (which is better even than the moisture content of the cold room setting cones (4.5%)). The cones of Process B contained 5% moisture, which is comparable to the cold room setting cones and far better than the room temperature setting.

Perceived Crispness of Cones

The 4 sets of cones were also subjected to organoleptic assessment by a trained panel to determine the relative crispness of the cones after 69 days in storage. It was found that the cones of the: Cold room setting; Process A; and Process B were all more crisp than those of the Room temperature setting cones. Moreover, the cones of Processes A and B were all perceived as more crisp than the Cold room setting cones.

It is therefore evident that the present invention is capable of achieving dramatic improvements in the ability of edible receptacles to maintain their organoleptic properties by using standard types and amounts of typical fat-based coatings but by adding the simple step of introducing a cooled gas into the receptacle just after coating via a gas dosing element having an external shape that corresponds to the interior of the receptacle.

It should be understood that the specific forms of the invention herein illustrated and described are intended to be representative only, as certain changes may be made therein without departing from the clear teachings of the disclosure.

The invention claimed is:

1. A process for manufacturing a coated edible receptacle for a frozen confection comprising the steps of:
   providing an edible receptacle,
   at least partially coating the internal surface of the edible receptacle by spraying a fat-based coating onto the internal surface of the edible receptacle, and
   introducing a gas-dosing element into the edible receptacle
   wherein the gas-dosing element has an external surface shape corresponding to the internal shape of the edible receptacle and wherein cooled gas is introduced into the edible receptacle through at least one aperture in the gas-dosing element and wherein the gas dosing element does not come into contact with the fat-based coating.

2. A process according to claim 1 wherein the cooled gas is at a temperature of from −20° C. to −200° C.

3. A process according to claim 1 wherein the edible receptacle is a wafer-based edible receptacle.

4. A process according to claim 1 wherein the edible receptacle is a cone.

5. A process according to claim 1 wherein the edible receptacle is coated with fat-based coating in a total amount of from 2 to 12 g.

6. A process according to claim 1 wherein the weight ratio of the total amount of the fat-based coating relative to the edible receptacle is from 5:1 to 1:5.

7. A process according to claim 1 wherein the fat-based coating is selected from the group comprising of chocolate, chocolate-based compositions, chocolate analogues, and couvertures.

8. A process according to claim 1 wherein the melting point of the fat-based coating is from 20° C. to 50° C.

9. A process according to claim 1 wherein the thickness of the final fat-based coating on the coated edible receptacle is from 0.5 mm to 5 mm.

10. A method for prolonging the crispness of an edible receptacle for a frozen confection, the method comprising the steps of:
    providing an edible receptacle,
    at least partially coating the edible receptacle by spraying a fat-based coating onto the internal surface of the edible receptacle, and then
    introducing cooled gas into the edible receptacle through a gas-dosing element having at least one aperture suitable for the introduction of cooled gas into the edible receptacle and an external surface shape corresponding to the internal shape of the edible receptacle.

* * * * *